United States Patent [19]

Sasaki

[11] Patent Number: 5,013,982
[45] Date of Patent: May 7, 1991

[54] CIRCUIT FOR DRIVING ULTRASONIC MOTOR

[75] Inventor: Toyoji Sasaki, Tokyo, Japan

[73] Assignee: Olympus Optical Co., Ltd., Japan

[21] Appl. No.: 512,983

[22] Filed: Apr. 23, 1990

[30] Foreign Application Priority Data

| May 2, 1989 | [JP] | Japan | 1-113103 |
| Dec. 20, 1989 | [JP] | Japan | 1-330161 |
| Dec. 26, 1989 | [JP] | Japan | 1-337024 |

[51] Int. Cl.$^5$ ............................................. H02N 2/00
[52] U.S. Cl. ................................... 318/114; 318/116; 310/316
[58] Field of Search ............... 318/116, 118, 119, 135; 310/316, 317, 318, 320, 323, 328; 331/116 R, 173

[56] References Cited

U.S. PATENT DOCUMENTS

| 3,379,995 | 4/1968 | Koontz et al. | 331/173 X |
| 3,879,698 | 4/1975 | Pepper | 310/317 X |
| 3,879,699 | 4/1975 | Pepper | 310/317 X |
| 3,967,143 | 6/1976 | Watanabe et al. | 318/116 X |
| 4,630,245 | 12/1986 | Dam | 310/317 X |
| 4,703,213 | 10/1987 | Gasler | 310/316 |
| 4,713,571 | 12/1987 | Suzuki et al. | 310/316 |
| 4,812,699 | 3/1989 | Ogawa et al. | 318/116 X |
| 4,868,527 | 9/1989 | Rhodes | 331/173 |

FOREIGN PATENT DOCUMENTS

| 59-148581 | 8/1984 | Japan. |
| 60-13480 | 1/1985 | Japan. |
| 62-171475 | 7/1987 | Japan. |
| 63-305774 | 12/1988 | Japan. |

Primary Examiner—Bentsu Ro
Attorney, Agent, or Firm—Louis Weinstein

[57] ABSTRACT

A circuit for driving an ultrasonic motor which is driven by being applied with multi-phase alternating voltages comprises: a digital oscillator for providing a signal having a frequency higher than that of said alternating voltages; a frequency divider for dividing the frequency of the output signal of the digital oscillator into a desired frequency to provide a basic clock signal; a plurality of presetting circuits, each of independently presetting a delay time for generating a plurality of delay clocks which are delayed with respect the basic clock by different delay times; a plurality of delay circuits, each connected with a respective one of the delay time presetting means for generating a plurality of different delayed clock which are delay with respect to said basic clock by different periods of delay time in accordance with the preset delay time; and voltage generators which generates multi-phase alternating voltages from the basic clock and plurality of the delayed clocks for applying the multi-phase alternating voltages upon the ultrasonic motor.

29 Claims, 10 Drawing Sheets

CIRCUIT FOR DRIVING ULTRASONIC MOTOR

FIELD OF THE INVENTION

The present invention relates to a circuit for driving an ultrasonic motor, and in particular to a circuit for driving an ultrasonic motor requiring more than one phase alternating voltage, which is capable of adjusting the phase difference between respective voltages at a high resolution.

BACKGROUND OF THE INVENTION

An ultrasonic motor which is driven by generating travelling vibrational waves by means of electromechanical energy conversion element such as piezoelectric element, electrostrictive element, magnetostrictive element has been well known. The ultrasonic motor using a piezo-electric element as a driving source for ultrasonic vibration will be briefly explained. A multiplicity of piezo-electric elements are polarized so that adjacent piezo-electric elements have opposite polarities and the elements are divided into two groups. Stators are secured to an elastic member at an interval of $\lambda/4+n\lambda$ (wherein $\lambda$ denotes a wave length of a travelling wave and n denotes an integer). When different alternating voltages Vo $\sin\theta$ and Vo $\cos\theta$ which have the same amplitude and are different by 90° ($\pi/2$) in phase at a resonant frequency determined by the shape and material of an oscillator comprising the elastic member and piezo-electric elements are applied to each group of electrodes of the respective piezo-electric elements of the stator, an elastic travelling wave is excited on the surface of the elastic member. Each material point on the surface of the elastic member at which the travelling wave is excited performs elliptical vibration in a direction opposite to the travelling direction. Therefore, if a rotor which is in frictional contact with the elastic member is placed around the apex of the peak of the travelling wave, the rotor will be moved in a direction of elliptical vibration. This is a principle of an ultrasonic motor.

Among the ultrasonic motors, the travelling wave type ultrasonic motor and the hybrid oscillator type ultrasonic motor in which vertical vibration and torsion vibration are synthesized require more than one phase alternating voltage. In these ultrasonic motors, theoretically it will suffice to render the phase difference between voltages constant.

However, if there are variations in operating parameters of the finished motors and phase difference between electrical and mechanical vibrations, it will not always suffice to provide a constant phase difference between voltages. Since inappropriate phase difference invites a decrease in energy conversion efficiency and motor output, a circuit may be provided for driving an ultrasonic motor in which phase difference between voltages is adjustable. One example of such driving circuit is disclosed in, for example, Japanese Unexamined Patent Publication No. Sho/62-171475.

The disclosed ultrasonic motor driving circuit effects relative movement between first and second structural members by applying phase different alternating voltages to an electro-mechanical energy conversion element mounted on a first structural member via first and second driving electrodes, respectively to induce travelling vibration waves on the first member. The driving circuit includes a circuit for detecting a deviation between the phase difference between the driving voltages detected at the first and second driving electrodes and a given phase difference and a circuit for regulating the phase differences between alternating voltages applied to the first and second electrodes in response to the output from the deviation detecting circuit.

In order to digitally preset the phase difference between alternating voltages at the regulating circuit in response to the output from the circuit for detecting the deviation of phase difference between alternating voltages, the output frequency of a VCO (voltage controlled oscillator) is divided by 32 by a frequency dividing circuit, so that signals which are shifted in phase by 11.25° (360°÷32) are obtained.

However, phase shift resolution would assume at least only 11.25° if an ultrasonic motor is formed as that disclosed in the above-mentioned Japanese Unexamined Patent Publication No. Sho/62-171475 in which oscillation output of VCO is divided by 32 by a frequency dividing circuit so that signals are phase-shifted by 11.25° (360°÷32). In order to obtain a higher resolution, the oscillation frequency should be increased. In case of a VCO, an increase in oscillation frequency shortens the period of electrical charging and discharging. Therefore, the capacitance used for VCO should be decreased so that the value of the charged and discharged electric current becomes lower.

This provides a lower immunity of the driving circuit to disturbance noise. Since power of several watts to several tens of watts is supplied to the ultrasonic motor, the noises from the supplied power make the oscillation frequency of the VCO unstable. The circuit per se becomes very sensitive to changes in characteristics of the charging and discharging parts, such as capacitors, resistors and transistors. Slight changes in temperature conditions will cause large changes in the oscillation frequency.

If the driving frequency is represented as fo, the oscillation frequency of a VCO is 32fo in case of the aforementioned Unexamined Patent Publication. For example, if fo is 40 kHz, the original oscillation frequency would be 1.28 MHz. The resolution of phase shift is only 11.25° as mentioned above even at such a high frequency oscillation. For a higher resolution, a higher oscillation frequency is necessary. Considering the circuit stability, it is very hard to obtain an oscillation frequency not less than 1 MHz by VCO.

Various functions are often required and restrictions are imposed on the application of an ultrasonic motor. In some type of ultrasonic motor, such as the afore-mentioned travelling wave type ultrasonic motor an optimum driving frequency varies depending upon external conditions such as temperature and external load. The frequency on starting should be preset higher than the driving frequency, otherwise the motor may not be started.

The speed of the ultrasonic motor should often be controlled. In order to control speed of the motor, frequency, phase and power and the like should be appropriately changed.

In case where a plurality of ultrasonic motors such as a motor for winding film and a motor for driving a lens are independently provided in a camera, two ultrasonic motors do not work simultaneously. Accordingly, only one driving circuit suffices if it is capable of appropriately switching the frequency and phase of the driving voltages. Accordingly, an ultrasonic motor driving circuit which is capable of readily switching the frequency, phase and output power is necessary to meet the various requirements by making the best use of the characteristics of the ultrasonic motor.

Addition of the afore-mentioned capabilities to a conventional circuit for driving an ultrasonic motor does not only provide a large and complicated scale of circuit, but also it requires a large space which the circuit occupies and invites high cost. Furthermore it provides more adjusting positions and a more complicated adjusting process, resulting in big problems in mass production. Countermeasure for changes in characteristics of the circuit due to aging of the parts should be taken. This also promotes the necessity of more precise parts and complicated circuits.

SUMMARY OF THE INVENTION

It is therefore an object of the present invention to provide a driving circuit for ultrasonic motor in which afore-mentioned problem are overcome.

It is another object of the present invention to provide a driving circuit for an ultrasonic motor requiring more than one phase alternating voltage in which the phase difference between the driving voltages is adjustable at a high resolution without being influenced by circuit noises or variations in characteristics of component members.

It is a further object of the present invention to provide a circuit for driving an ultrasonic motor in which the frequency and the phase of the driving voltage can be readily switched.

It is a further object of the present invention to provide a circuit for driving an ultrasonic motor in which the frequency of the driving voltage is changed depending upon the state of the motor and the phase and the power of the driving voltages can be changed for controlling the motor speed.

It is a further object of the present invention to provide a circuit for driving an ultrasonic motor which may be readily adjusted and is small in circuit scale and requires less cost.

In an aspect of the present invention, there is provided a circuit for driving an ultrasonic motor which is driven by being applied with two phase alternating voltages, comprising: a digital oscillator for providing a signal having a frequency higher than that of said alternating voltages; first means for presetting a frequency dividing ratio at which the oscillation frequency of the digital oscillator is divided into a desired frequency; means for dividing the frequency of the output signal of the digital oscillator in accordance with the preset value preset by the first presetting means to provide a first clock signal; second means for presetting a delay time which is an integer multiple of the period of the oscillation output by which said first clock signal is delayed; means for delaying the first clock signal in accordance with the preset value of the second preset means to provide a second clock signal; and voltage applying means for providing first and second alternating voltages from the first and second clock signals, said second clock signal being delayed with respect to the first clock signal by said delay time to apply the two phase alternating voltages to the ultrasonic motor.

The frequency dividing means may include a downcounter in which the value preset by the first presetting means is preset and which starts downcounting of the oscillation output of the digital oscillator from the preset value and generates a one shot pulse on completion of counting.

The delay means may include a downcounter which receives said first clock signal as a preset enabling signal and starts downcounting of the oscillation output of the digital oscillator from the preset value preset by said second presetting means and provides a one shot pulse on completion of counting.

The digital oscillator may include a quartz crystal oscillator.

In another aspect of the present invention, there is provided a circuit for driving an ultrasonic motor which is driven by being applied with multi-phase alternating voltages, comprising: a digital oscillator for providing a signal having a frequency higher than that of said alternating voltages; means for dividing the frequency of the output signal of the digital oscillator into a desired frequency; delay means including a presettable digital counter for delaying the output signal from the frequency dividing means by an integer multiple of the period of the oscillation frequency of the digital oscillator; means for applying the output signals from the frequency dividing means and the delay means to the ultrasonic motor as multi-phase alternating voltages, respectively; and control means for changing the delay time of said delay means by changing the preset value of said delay means to change the relative phase among the multi-phase alternating voltages.

As mentioned above, the present invention does not use a VCO as an oscillator but uses a stable oscillator such as quartz crystal oscillator and divides the frequency of the output from the oscillator. Accordingly, instability due to noises and variations in characteristics of components is eliminated even when the oscillation frequency of the oscillator is preset high. As a result, the phase difference between driving voltages in the circuit for driving an ultrasonic motor requiring two or more phase alternating voltages can be adjusted at a high precision. A distinct effect that the resolution of phase shift can be improved may be obtained.

In accordance with the present invention, the frequency and phase of the driving voltage is readily changed and no adjustment is necessary and presetting of the frequency and the phase can be carried out merely by storing the data in a memory. Furthermore, speed control is possible by changing the pulse width to increase or decrease the supplied power or by changing the frequency and the phase. Very flexible control is possible since the control relies upon a program stored in the microcomputer.

Correcting of the frequency and the phase of the driving voltage and the supplied power is possible.

Since the microcomputer is implemented by one-chip and other circuits excepting a power amplifier may comprise digital circuits, the driving circuit may be formed of IC's. Accordingly, the size of the circuit may be made smaller than a conventional circuit and reduction in manufacturing cost is possible.

DESCRIPTION OF THE PREFERRED EMBODIMENTS

Figure 1:
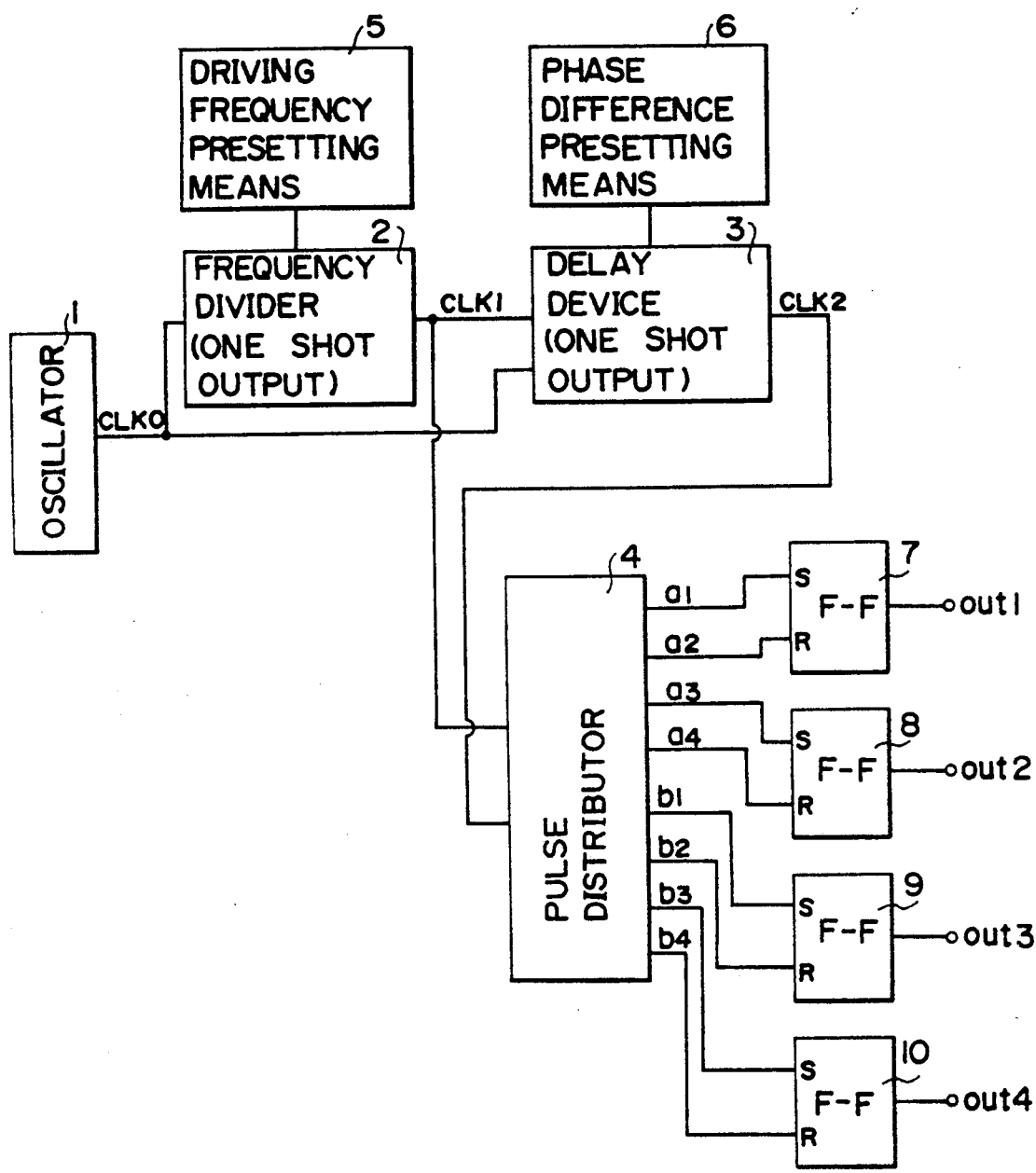
FIG. 1 is a block diagram showing a first embodiment of a circuit for driving an ultrasonic motor of the present invention.
Figure 2:
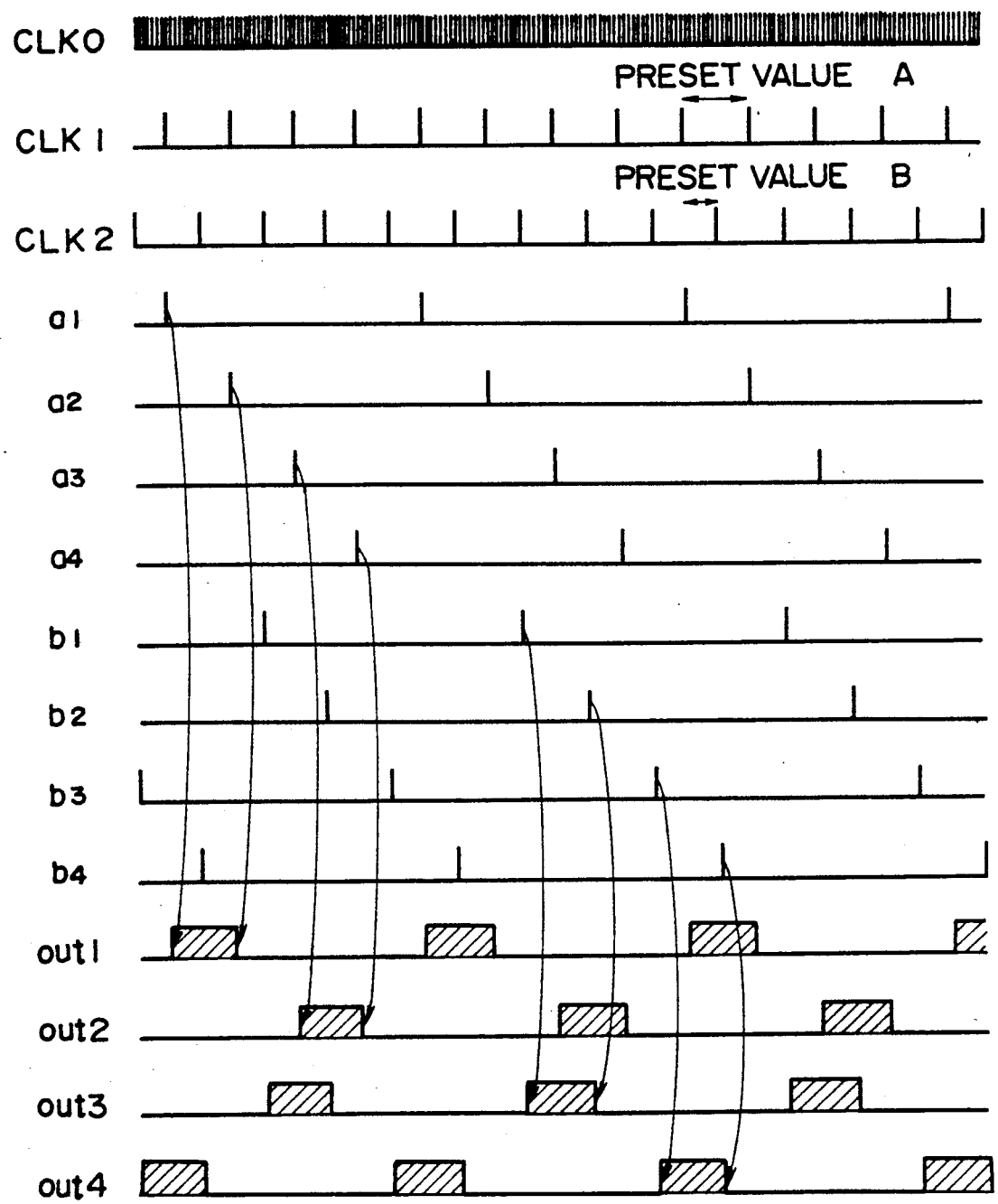
FIG. 2 is a timing chart for explaining the operation of each part of the circuit in FIG. 1.

Referring now to FIGS. 1 and 2, there are shown a block diagram of a circuit for driving an ultrasonic motor and a timing chart showing the operation of each parts in the circuit in FIG. 1, respectively.

An oscillator 1 generates an oscillation output CLK0 having an oscillation frequency sufficiently higher than the driving frequency fo of the ultrasonic motor. The oscillator 1 is not a voltage controlled oscillator (VCO), but includes oscillator having a fixed oscillation frequency, such as quartz oscillator having a high stability.

The frequency of the output from the oscillator 1 is divided by a frequency divider 2, which outputs a first clock signal CLK1 including a one-shot pulse output having a frequency of 4fo. A delay device 3 digitally delays the first clock signal CLK1 by an integer multiple of a unit time which is one period of the oscillation output CLK0 to output a second clock signal CLK2 having the same frequency as that of the first clock signal CLK1. The second clock signal CLK2 is also a one shot output which is the same as the first clock signal CLK1.

The first and second clock signals CLK1 and CLK2 are inputted into a pulse distributor 4 which generates output signals a1 to a4 and b1 to b4. The distributor output signals a1 to a4 and b1 to b4 are pulse outputs obtained by frequency dividing by 4 the outputs of the first and second clock signals CLK1 and CLK2 and by shifting the divided signals by a quarter of period in order of a1 to a4 and b1 to b4, respectively as shown in FIG. 2. The pulse outputs a1 to a4 and b1 to b4 are applied to R-S flip-flops 7 to 10, which provide F—F output signals out1 to out4, respectively as shown in a time chart of FIG. 2.

F—F output signals out1 and out2 have a duty ratio of ½ and are 180° shifted in phase with each other. This is same as F—F output signals out3 and out4. F—F output signal out3 is delayed in phase by 90° plus a delay caused by delay device 3 with respect to F—F output signal out1. That is, the phase differences between F—F output signals out1 and out3, and between F—F output signals out2 and out4 may be changed by the delay device 3. Presetting of a phase difference and a driving frequency is accomplished by a phase difference presetting means 6 and a driving frequency presetting means 5, respectively.

Figure 3:
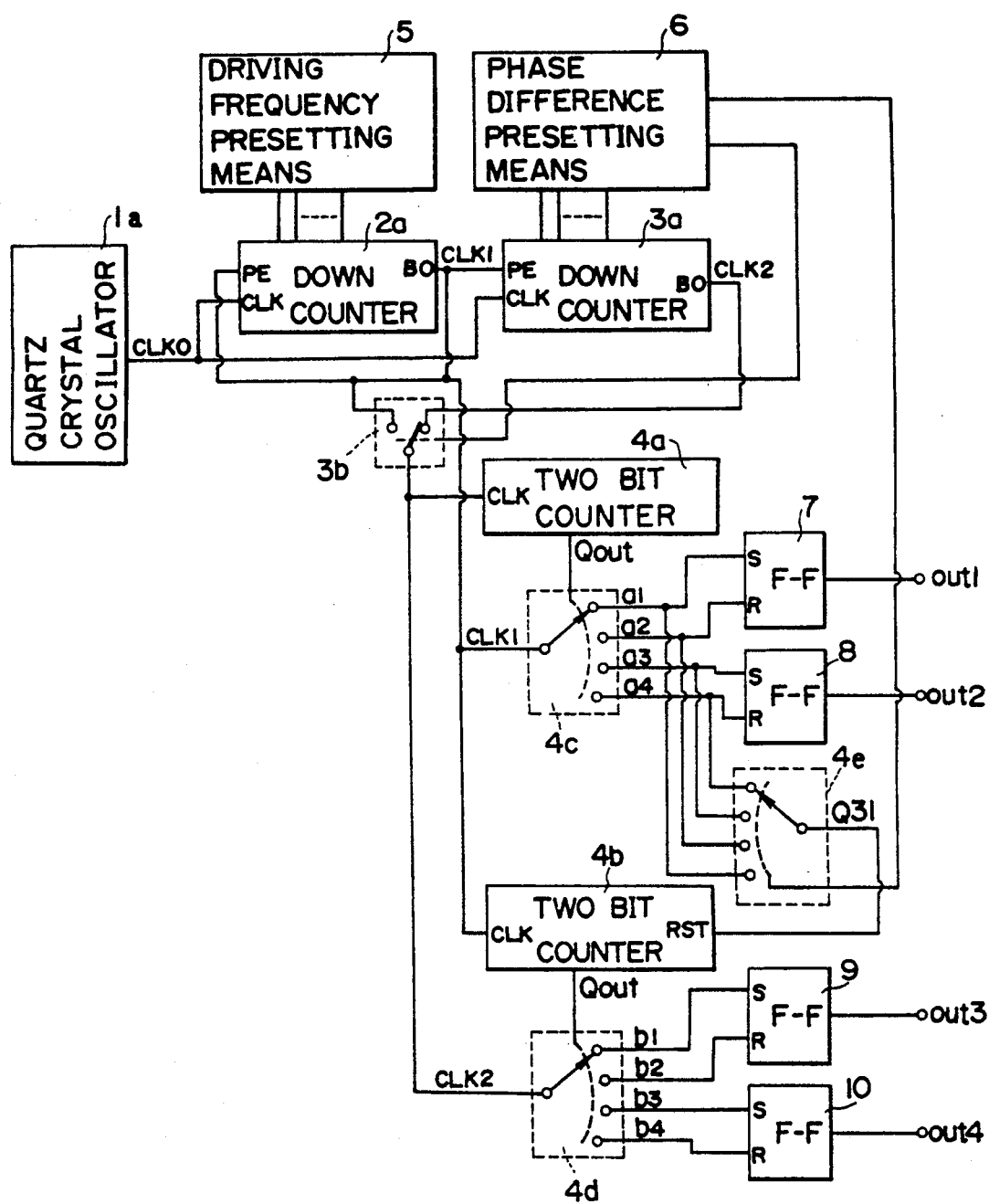
FIG. 3 is a block diagram showing a pulse distributor and etc. of FIG. 1 in detail.

Referring now to FIG. 3, there is a block diagram specifically showing the frequency divider 2, the delay device 3 and the pulse distributor 4 and the like. A quartz oscillator 1a, a downcounter 2a and a downcounter 3a in FIG. 3 correspond to the oscillator 1, the frequency divider 2 and the delay device 3, respectively. These downcounters 2a and 3a start counting from a value preset by the driving frequency presetting means 5 and the phase difference presetting means 6, respectively. That is, each time when the oscillation output signal CLK0 is inputted into the clock signal input terminal CLK, each counters counts down or decrements. When they reach a count (00 . . . 0), they output a one-shot pulse from a borrow output terminal BO and are preset to start downcounting again. These series of decremental or downcount operations will be repeated. Thus obtained first and second alternating signals CLK1 and CLK2 are applied to the pulse distributor 4.

Now the afore-mentioned presetting operation will be described. The downcounter 2a will read a preset value preset by the driving frequency presetting means 5 when a borrow output from the borrow output terminal BO of the downcounter 2a, that is, the first alternating signal CLK1 is applied to the preset enable terminal PE. The preset value corresponds to a preset value A shown in the timing chart of FIG. 2. Multiplication of the preset value A by a period of the oscillation output signal CLK0 can determine a period of the clock signal CLK1.

The downcounter 3a will read a preset value of the phase difference presetting means 6 when the first clock signal CLK1 becomes active since the signal applied to the preset enable terminal PE is the first clock signal CLK1. The preset value corresponds to a preset value B shown in the timing chart of FIG. 2. When the counter 3a counts the oscillation output signal CLK0 by the preset value B, the second clock signal CLK2 is outputted from the borrow output terminal. Accordingly, multiplication of the preset value B by the period of the oscillation output signal CLK0 can determine a delay time caused by the delay device represented by the downcounter 3a.

The pulse distributor 4 comprises two-bit counters 4a and 4b, one-input and four-output multiplexers 4c and 4d and a four-input and one-output multiplexer 4e. Each time a pulse of the second clock signal CLK2 is inputted to the clock signal input terminal CLK of the two-bit counter 4a, the output of the multiplexer 4c is switched. Accordingly, the first alternating signals CLK1 applied to the input terminal of the multiplexer 4c are distributed to terminals a1, a2, a3, a4 in order. Similar to the two-bit counter 4a, each time a pulse of the first clock signal CLK1 is inputted to the two bit counter 4b, the output of the multiplexer 4d is switched responsive to an output from the two-bit counter 4b so that the second clock signals CLK2 are distributed to terminals b1, b2, b3 and b4 in order. However since this can not establish a timing relation of the output signals a1 to a4 and b1 to b4 from the distributor, any one of the pulse signals a1 to a4 is inputted to a reset input terminal RST of the two bit counter 4b by the multiplexer 4e for establishing a timing relation. It will be necessary to avoid overlapping of a CLK input and an RST input by providing the first alternating signal CLK1 inputted to the two bit counter 4b with a slight delay time. If F—F output signals out1 to out4 are outputted via RS flip-flops 7 to 10, the phase difference between F—F output signals out1, out2 and F—F output signals out3, out4 are always constant. Selection of the multiplexer 4e can change the phase difference by every 90°.

The reasons why the pulse distributor is provided are as follows:

There may be some likelihood that timing error will occur in the course of frequency dividing by four at stages followed by the frequency divider 2 and the delay device 3. In this case, there may be a likelihood that the phase difference of the final outputs will be different, for example +90°, +180°, +270°. Therefore in order to avoid such timing error, the pulse distributor 4e is provided to always keep the phase relation constant.

The reasons why the multiplexer 3b is provided in the circuit of FIG. 3 is so that switching between the outputs of the delay device 3a and the frequency divider 2a may be carried out.

In the case where the preset value of the phase difference presetting means 6 is zero or same as the preset value of the driving frequency presetting means 5, in other words, delay time is made zero or the same as the period of the downcounter 2a, there is a likelihood that an appropriate output of CLK2 may not be obtained. If the phase difference preset value is 00...00, the output of the downcounter 3a assumes 99...9 in response to a next clock pulse CLK1. Accordingly, the downcounter will not output CLK2. If the phase difference preset value is the same as the preset driving frequency value, the downcounter outputs CLK1 at the same timing with the output timing of CLK2 from downcounter 3a. Accordingly the downcounter will assume a preset enable state so that it can not output CLK2.

In order to prevent such phenomenon from occurring, the afore-mentioned presetting is not avoided. Switching of the multiplexer 3b is conducted to pass the output of the frequency divider 2a to the next stage as CLK2 in lieu of the output of the delay device 3a. By doing so, it can be deemed that a signal equivalent to an output delayed by zero or a period of the downcounter 2a be obtained since the signal CLK2 is same as CLK1.

Figure 4:
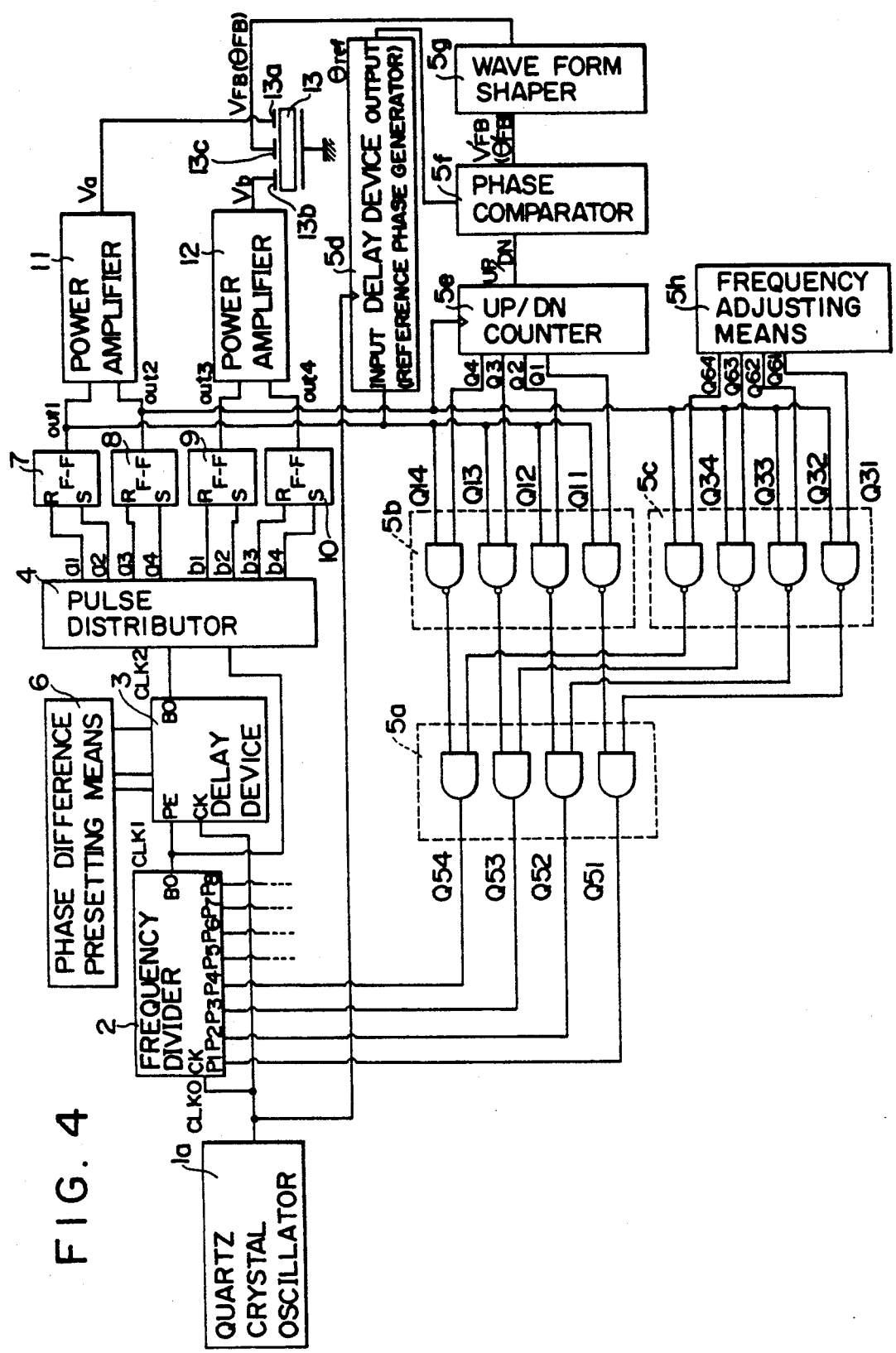
FIG. 4 is a block diagram showing an example in which the circuit is applied to a travelling wave type of ultrasonic motor.

Referring now to FIG. 4, there is the block diagram showing that the circuit for driving an ultrasonic motor of the first example is applied to a travelling wave ultrasonic motor. Like numerals in FIG. 4 represent like components in FIGS. 1 and 3. The description of like components will be omitted.

An oscillation output signal CLK0 output from the quartz crystal oscillator 1a is applied to a frequency divider 2 and a delay device 3. The frequency divider 2 comprises an 8 bit presettable downcounter. Preset input terminals P5 to P8 are preset to predetermined values. Preset input terminals P1 to P4 are preset by input signals Q51 to Q54 of an AND gate array 5a which will be explained hereafter. The frequency divider 2 begins downcounting from a preset value and will be preset again when the output becomes (00...0). Accordingly the divider will output a first clock signal CLK1 having a period which is equal to a preset value multiplied by the period of CLK0.

The first clock signal CLK1 is fed to the delay device 3 which is preset by a phase difference presetting means 6 so that the delay device 3 generates a second clock signal CLK2 from the borrow output terminal B0. The first and second alternating signals CLK1, CLK2 are fed to a pulse distributor 4 to generate distributor output signals a1 to a4, b1 to b4 from the output terminal thereof. These output signals a1 to a4, b1 to b4 are supplied to R-S flip-flops 7 to 10 so that they generate F—F output signals out1 to out4 from the output terminal thereof. The delay device 3, the phase difference presetting means 6, the pulse distributor 4 and the R-S flip-flops 7 to 10 are same as those of the embodiment shown in FIGS. 1 and 3.

Figure 5:
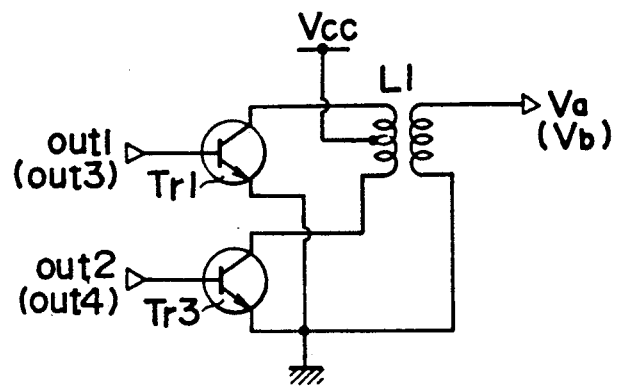
FIG. 5 is a circuit diagram showing an example of the power amplifier shown in FIG. 4.

The signals out1 and 2 are fed to a power amplifier 11 while the signals out3 and out4 are fed to a power amplifier 12. The power amplifiers 11, 12 are formed as shown in FIG. 5. The signals out1 and out2 or out3 and out4 alternately turn on transistors Tr1 and Tr3 so that alternating voltages Va, Vb are alternately outputted from the secondary winding of a transformer L1. Application of the alternating voltages Va and Vb to the driving electrodes 13a, 13b of an ultrasonic motor 13 shown in FIG. 4 causes the motor 15 to start rotating.

A feed-back signal obtained from a monitor electrode 13c of the ultrasonic motor 13 is fed to an AND gate array 5a by frequency adjusting means 5b which form the driving frequency presetting means 5 shown in FIGS. 1 and 3. The AND gate array 5a to frequency adjusting means 5h are adapted to preset a reference point of the driving frequency and to track an optimum driving frequency in response to an output signal from the monitor electrode 13c. These circuits have been described in pending Japanese Patent Application No. Hei/1-2625 which was filed with Japanese Patent Office by the present assignee. These circuits will be described in brief. In the description, the signals are identified with the phase angle names of the signals outputted from respective parts.

Sinusoidal feedback signal $\theta_{FB}$ having an amplitude of $V_{FB}$ and a phase angle of $\theta_{FB}$ is taken from the monitor electrode 13c and is transformed into a rectangular signal $\theta_{FB}'$ having a voltage $sV_{FB}'$ and a phase angle $\theta_{FB}'$ by means of the wave form shaper 5g. The phase $\theta_{FB}'$ of the rectangular wave $\theta_{FB}'$ is defined by the rise-up edge. The rectangular signal $\theta_{FB}'$ is compared with the rise-up edge of a reference phase signal $\theta$ref outputted from the delay device 5d. If the $\theta_{FB}'$ is advanced or delayed, the phase comparator outputs L or H, respectively. The reference phase signal $\theta$ref is a digitally delayed F—F output signal out1 of the R-S flip-flop 7. The delay device 5d counts the oscillation output signal CLK0 in response to the rise-up edge of the F—F output signal out1. When the delay device 5d counts a predetermined number, it outputs one shot pulse as a reference phase signal $\theta$ref. The predetermined number may of course be digitally preset. This can advance or delay the reference phase signal $\theta$ref. The fineness of presetting relies upon the oscillation output signal CLK0 having an oscillation frequency sufficiently higher than the driving frequency. The range of presetting may cover 360°.

An output signal from the phase comparator 5f is an UP/DN signal applied to UP/DN counter 5e. At this time, clock pulse for UP/DN counter 5e is an F—F output signal out2 and may be the other signal or may be a frequency-divided signal out2. Counter output signals Q1 to Q4 outputted from UP/DN counter 5e are supplied to preset input terminals P1 to P4 of the frequency divider 2 via an array of NAND gates 5b and AND gates 5a to directly change the driving frequency in a digital manner.

Input signals to NAND gates 5b are represented as Q11 to Q14. When F—F output signal out1 is "H", the output of the gates 5b are $(Q11,Q12,Q13,Q14)=(\overline{Q1},\overline{Q2},\overline{Q3},\overline{Q4})$. When out1=L, the gates always output (H,H,H,H). The outputs of the frequency adjusting means 5b are represented as Q61 to Q64. When out2=H, the NAND gate outputs $(Q31,Q32,Q33,Q34)$ $$= \overline{(Q11, Q12, Q13, Q14)}$$
$$= \overline{(Q61, Q62, Q63, Q64)}.$$

When out2=L, the NAND gates always output (H,H,H,H) "when out2"=H.

If out1=H, out2=L. Therefore, when out1=H, NAND gate outputs (Q51,Q52,Q53,Q54)

$$= \overline{(Q11, Q12, Q13, Q14)}$$
$$= \overline{(Q1, Q2, Q3, Q4)}.$$

If out2=H, out1=L. Therefore, (Q51,Q52,Q53,Q54)

$$= \overline{(Q31, Q32, Q33, Q34)}$$
$$= \overline{(Q61, Q62, Q63, Q64)}.$$

When out3=H or out4=H, out1=out2=L. Therefore, (Q51,Q52,Q53,Q54)=(H,H,H,H).

Timing of presetting of the preset input terminals P1 to P4 of the frequency divider 2 in which the preset input terminals P5 to P8 are preliminarily preset to given values and timing of switching of F—F output signals out1 to out4 outputted from R-S flip-flops 7 to 10, respectively is done in such a manner that the frequency divider 2 is initially preset and then the F—F output signals out1 to out4 are switched. The preset values which determine the length of time 1, at which out1=H are values of Q51 to Q54 when out4=H. The lengths of time t2 at which out3=H, time t3 at which out2=H, time t4 at which out4=H are determined by the values of Q51 to Q54 when out1=H, out3=H, and out2=H, respectively. Accordingly, t1 and t3 are always constant while t2 and t3 are changed by the output from UP/DN counter 5e and the frequency adjusting means 5b, respectively.

That is, the NAND gates 5b and the AND gates 5a will shorten the time t2 at which out3=H as the UP/DN counter 5e up-counts. They will extend the time t2 as the counter 5e down-counts. When the phase $\theta_{FB}'$ of the rectangular wave signal $\theta_{FB}'$ advances, the time t2 will be extended so that the driving frequency will decrease. When the phase delays, the time t2 will be shortened so that the driving frequency will increase. In such a manner, correction of the frequency to an optimum driving frequency of the ultrasonic motor, that is, automatic frequency tracking is carried out.

Figure 6:
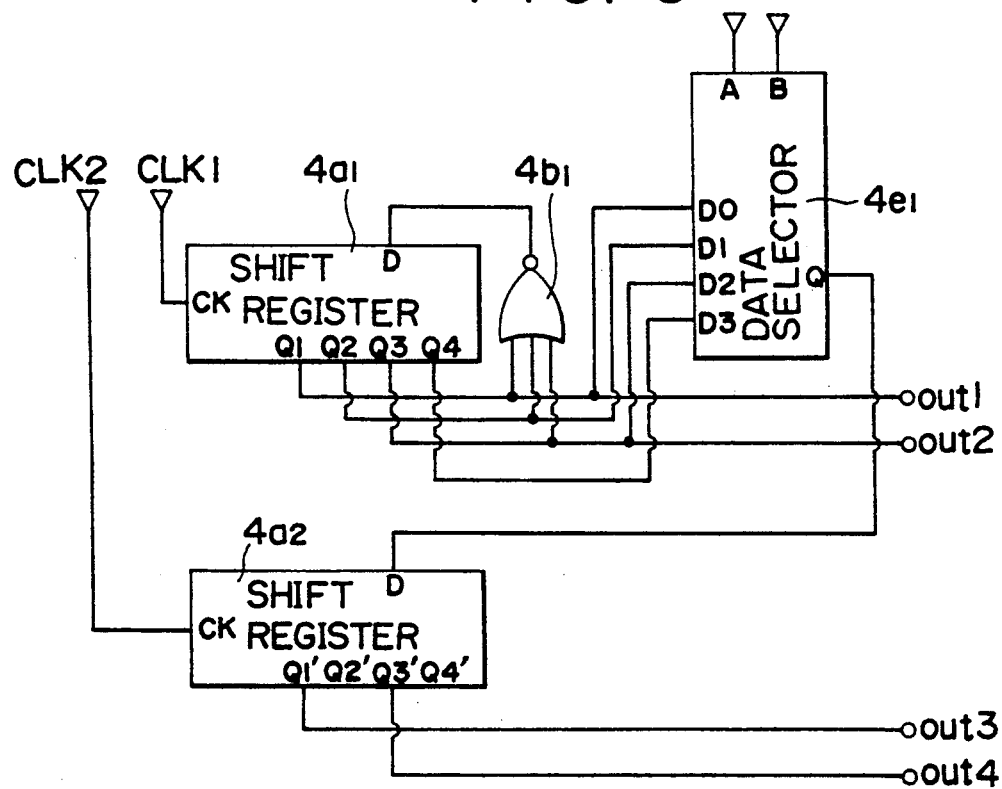
FIG. 6 is a block diagram showing another example of the pulse distributor shown in FIG. 3.

Referring now to FIG. 6, there is a block diagram showing a variation of the pulse distributor 4 and R-S flip-flops 7 to 10, that generates F—F output signals out1 to out4.

A shift register $4a_1$ and a three-input NOR gate $4b_1$ are formed to function as a ring counter. Pulse outputs Q1 to Q4 having consecutively 90° shifted phase and a duty ratio of ¼ are obtained as shown in the time chart of FIG. 7 in response to the input of the first clock signal CLK1. Q1 and Q3 of the pulse outputs correspond to the afore-mentioned F—F output signals out1 and out3.

Figure 7:
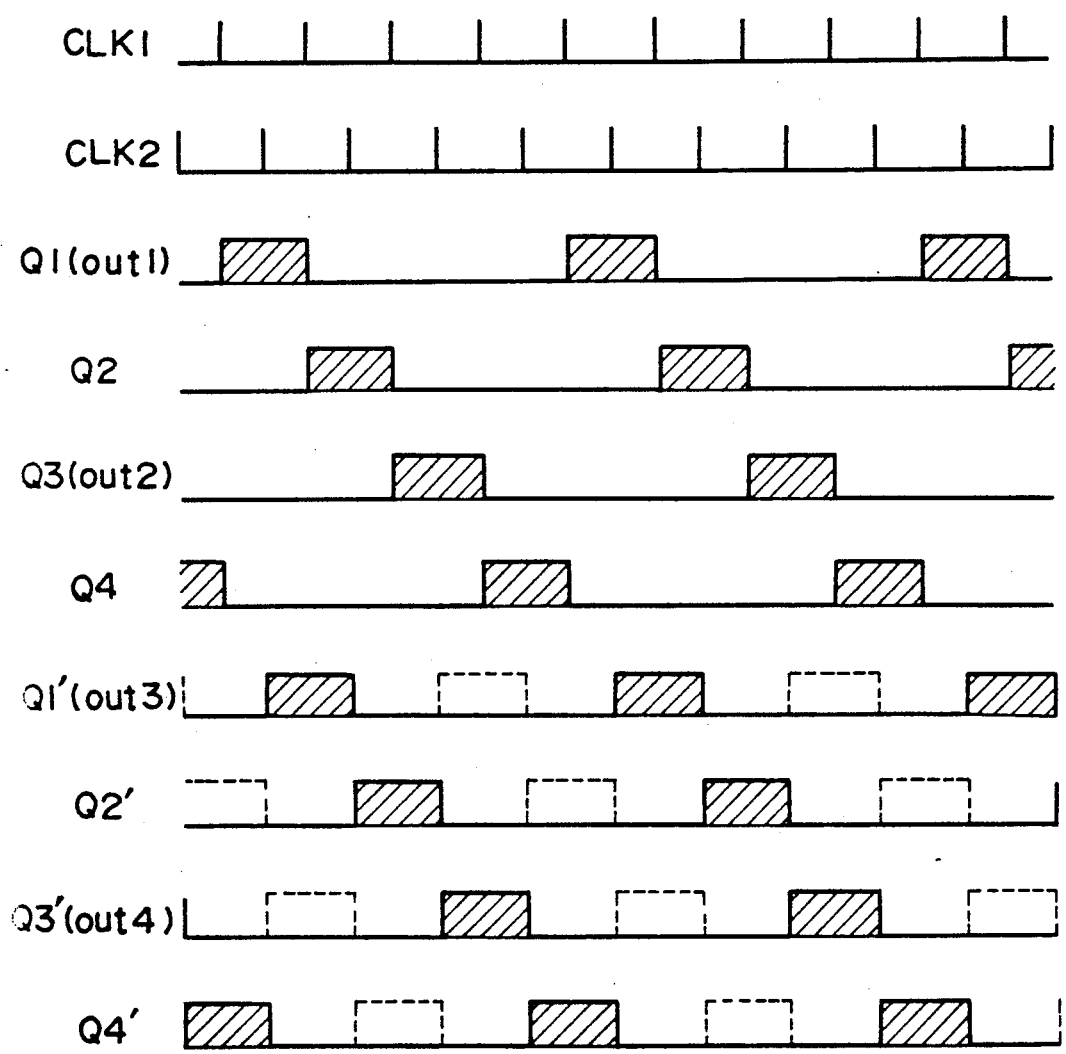
FIG. 7 is a time chart for explaining the operation of each part in FIG. 6.

Similarly, the second clock signal CLK2 may be frequency-divided by four by means of a ring counter. However as mentioned above, only provision of a ring counter may cause a timing error between Q1 to Q4 which are four divided CLK1 and Q1' to Q4' which are four-divided CLK2. Then any of pulse outputs Q1 to Q4 from the shift register $4a_1$ is inputted in a data input of the shift register $4a_2$ so that a timing relation is always constant. At this time, selection of any of the pulse outputs Q1 to Q4 is carried out through data selector $4e_1$. Its control is carried out by control terminals A and B. For example, when the data selector $4e_1$ selects Do, that is a pulse output Q1, the shift register $4a_2$ outputs the pulse output Q1' to Q4' as shown in FIG. 7. In this case, when a signal CLK2 is input while the pulse output Q1 is "H", the shift register $4a_2$ renders a pulse output Q1' of "H". Since Q1=2 when next signal CLK2 is inputted, the shift register $4a_2$ renders the pulse outputs Q1' and Q2' "L" and "H", respectively. When the next signal CLK2 is inputted, only a pulse output Q3' is brought into "H". On application of next signal CLK2, only a pulse output Q3' is brought into "H". Then, only a pulse output Q4' is brought into "H". Since the pulse output Q1=H on application of next signal CLK2, only Q1 is brought to "H". Thus, a constant relation of phase difference between Q1 to Q4 and Q1' to Q4' is maintained.

When the data selector $4e_1$ selects D1, that is, a pulse output Q2, the phase will be shifted by 90°. When D2, that is, a pulse output Q3 is selected, the phase will be shifted by 180°. When D3, that is, a pulse output Q4 is selected, the phase will be shifted by 270°. As an example, pulse outputs Q1' to Q4' when the data selector $4e_1$ selects the pulse output Q3 are shown in dotted line in FIG. 7.

It may be clearly understood that the pulse distributor 4 and R-S flip-flops 7 to 10 in FIG. 3 may be replaced with the circuit of FIG. 6 if it is deemed that the pulse outputs Q1' and Q2' correspond to the circuit of FIG. 6.

It is apparent that the data selector $4e_1$ may be replaced with a multiplexer.

The resolution of the phase shift attainable by the thus formed driving circuit for an ultrasonic motor of the first embodiment will be described. Assuming that the oscillation frequency is 12 MHz, the driving frequency to be 40 kHz, the number of the oscillation output signals CLK0 which are counted for one cycle of fo would be as follows:

$$12 \times 10^6 \div (40 \times 10^3) = 300.$$

Hence, the resolution is $360° \div 300 = 1.2°$.

This value is large enough that there is no problem to adjust the phase difference of the driving voltage of the usual ultrasonic motor.

Since an embodiment in which an ultrasonic motor is driven by two phase power has been described, a circuit for driving a three phase ultrasonic motor will now be described. The ultrasonic motor of this type of course requires more than two phase alternating voltage. For example, such ultrasonic motors are disclosed by the following laid-open patent applications.

(1) Japanese unexamined patent publication Sho/No. 59-148581 discloses a motor which uses four phases, which are shifted by 0°, 90°, 180° and 270° (refer to FIG. 5 in this publication).

(2) Japanese unexamined patent publication Sho/No. 60-13480 discloses a motor which uses three phases which are shifted by 0°, 120° and 240° (refer to FIG. 3 in this publication). The power source is shown in FIG. 3 in this publication.

(3) Japanese unexamined patent publication Sho/No. 63-305774 discloses a motor which uses eight different phases (refer particularly to FIG. 7 in this publication).

Figure 8:
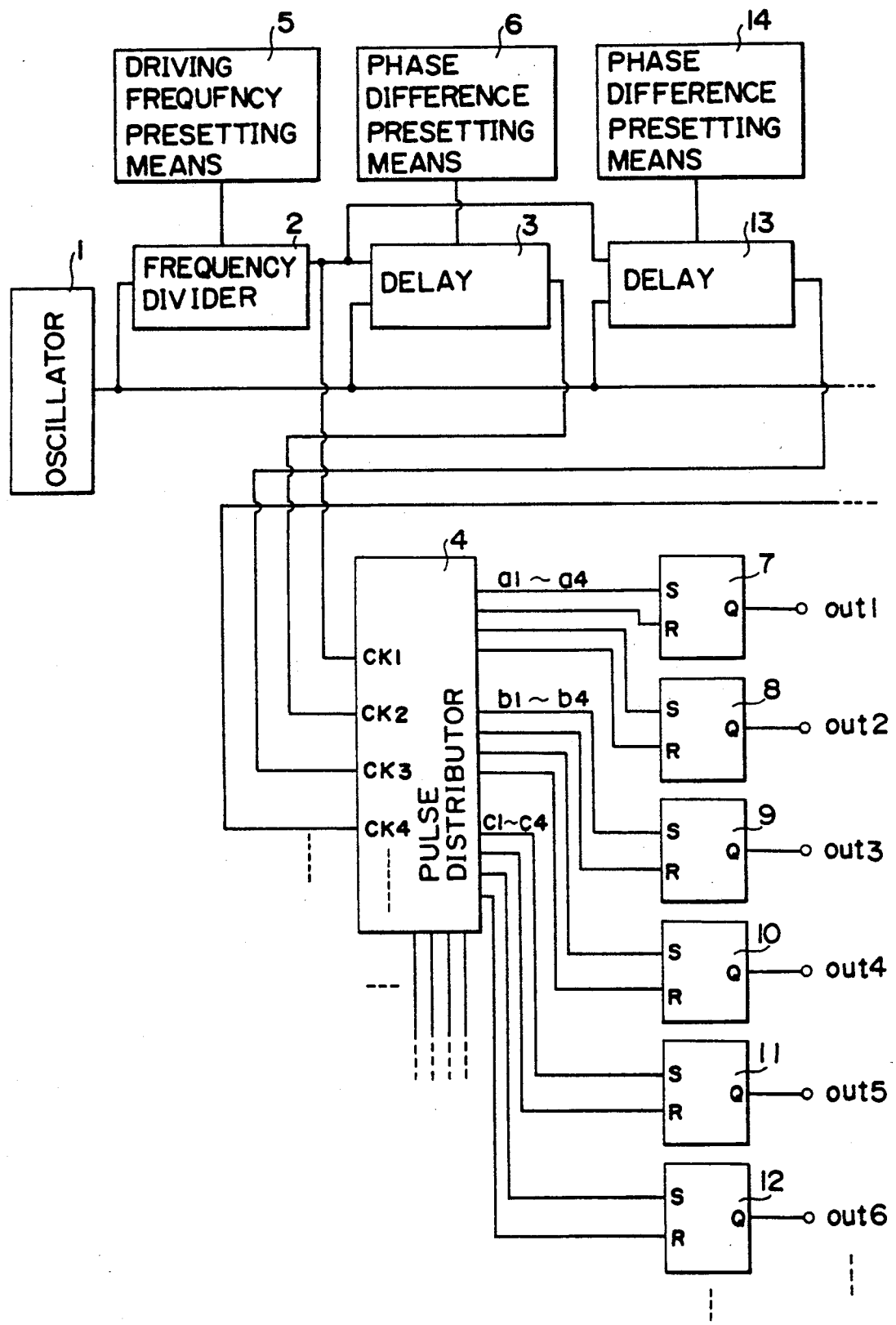
FIG. 8 is a block diagram showing a second embodiment of a circuit for driving an ultrasonic motor.

Referring to FIG. 8, there is shown a block diagram showing a second embodiment of a circuit for driving an ultrasonic motor. The second embodiment is formed to generate more than two phase alternating voltages while the first embodiment is formed to generate two phase alternating voltages. The second embodiment is substantially identical with the first embodiment shown in FIG. 4 with respect to structure except that a delay device 13, phase difference presetting means 14 and the like which are similar to the delay device 3 and the phase difference presetting means 6 are added in the former embodiment. In the second embodiment, the delay device 13 and the phase difference presetting means 14 determine the third phase. Similar means may be provided to determine the fourth, fifth . . . , phases. The pulse distributor 4 may be newly added with the 2 bit counter 4b, multiplexers, 4d, 4e, and R-S flip-flops 11, 12. Since operation and effects of the second embodiment is identical with those of the first embodiment, detailed description of operation and effects of the second embodiment will be omitted herein.

Figure 9:
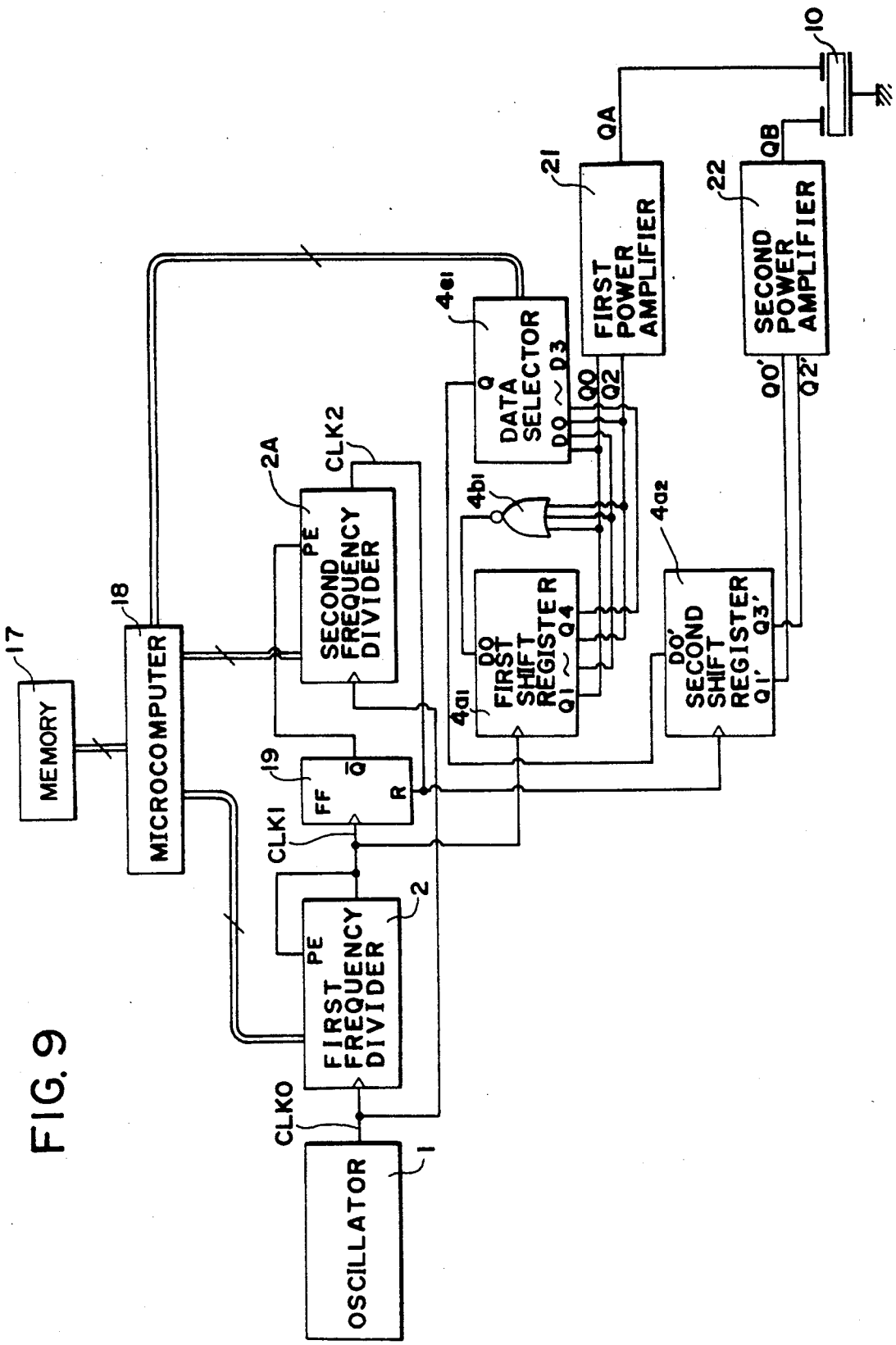
FIG. 9 is a block diagram showing a third embodiment of a circuit for driving an ultrasonic motor.

Referring now to FIG. 9, there is shown a third embodiment of the circuit for driving an ultrasonic motor.

The driving circuit mainly comprises a quartz crystal oscillator 1 which generates an oscillator output having a frequency, for example, 24 MHz, a first frequency divider 2 which divides the frequency of the output of the oscillator 1, a second frequency divider 2A which shifts phase by 0° to 90°, first and second shift registers $4a_1$ and $4a_2$ into which the outputs of the first and second frequency dividers 2, 2A are inputted, first and second power amplifiers 21 and 22 which power-amplify the outputs of the first and second shift register $4a_1$ and $4a_2$, respectively, a memory 17 of E$^2$PROM typed which forms a memory means, a microcomputer 18 which forms a frequency control circuit and a data selector $4e_1$ for presetting a phase difference of 0°, 90°, 180° and 270°.

A clock signal CLK0 having a frequency of 24 MHz which is oscillated by an oscillator 1 is inputted to the first and second frequency dividers 2 and 2A. The frequency dividers 2, 2A may comprise for example, divider IC74HC40103 (manufactured by RCA Corporation) or up/down counter IC74HC191 (manufactured by RCA Corporation) used as a downcounter.

Preset values which determine a frequency dividing ratio and a delay time of the frequency dividers 2 and 2A are preset by the microcomputer 18 and change the frequency of the outputs CLK1 and CLK2 from the first and second dividers 2 and 2A, respectively.

Figure 10:
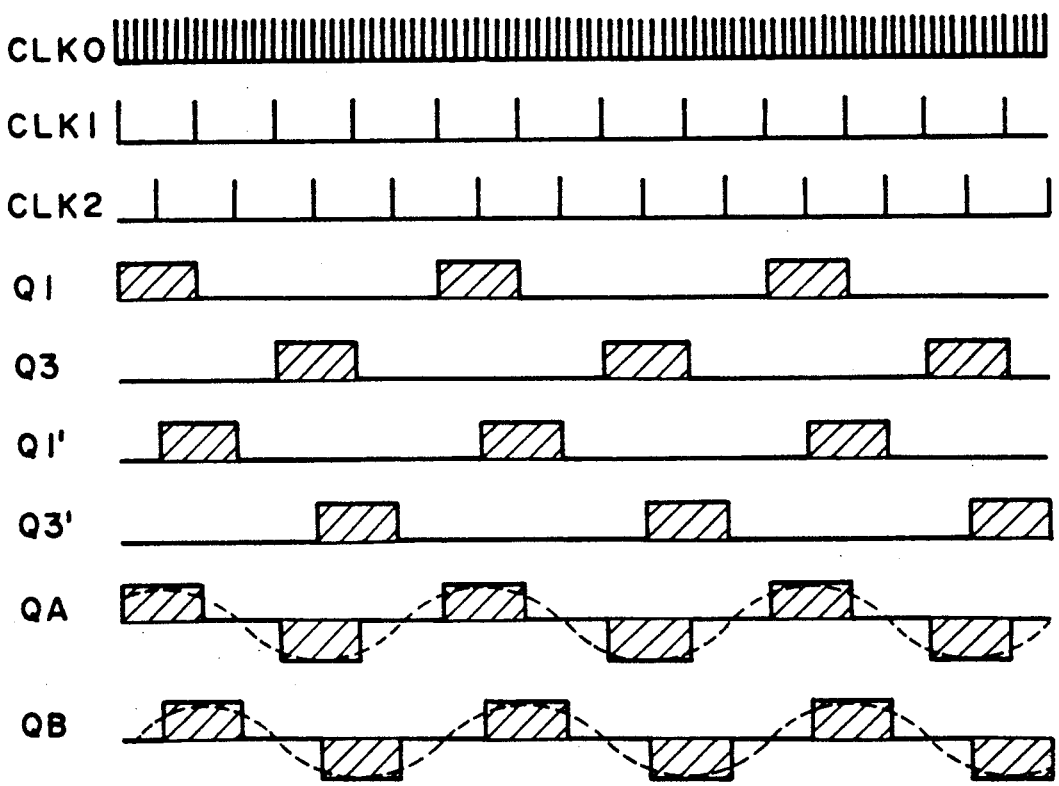
FIG. 10 a timing chart showing the timing relation of the signals in the driving circuit in FIG. 9.

The output CLK1 of the first divider 2 is inputted to a ring counter comprising a four bit shift register $4a_1$ and a NOR gate 4b. The output signal is converted into output pulse signals Q1 to Q4 as shown in FIG. 10 by a ringcounter. Among the signals Q1 to Q4, the signals Q1 and Q3 are inputted into the first power amplifier 21.

The second frequency divider 2A serves as a delay device which effects a phase shift over a range of 0° to 90°. The operation of the second frequency divider 2A and the driving circuit of the present embodiment will be explained with reference to a time chart in FIG. 10. When an output signal CLK1 is outputted from the first frequency divider 2 to a preset enable terminal PE, the output Q of a flip flop circuit (hereinafter referred to as FF) changes from "1" state to "0" state. Accordingly, the second frequency divider 2A is rendered from a preset state into a downcount state when the PE Terminal is in the state of "1". The second frequency divider 2A downcounts by one from the preset value every time when the clock signal CLK2 is inputted and outputs a clock pulse signal CLK0 when the count becomes 0. The FF 19 is reset by the pulse output signal CLK2 so that the output Q of the FF 19 becomes "1" state again. Accordingly, the second frequency divider 2A becomes a preset state. When a pulse output signal CLK1 is outputted from the first frequency divider 2, the operation mentioned above will be repeated.

In such a manner, the clock pulse signal CLK2 causes to output a pulse which is delayed by a preset value with respect to the signal CLK1. The pulse signal CLK2 is inputted to the clock input terminal of the second shift register $4a_2$ and an output Q of the data selector $4e_1$ is inputted to the terminal D0' of the second shift register $4a_2$. Output signals Q1 to Q4 of the first shift register $4a_1$ are inputted to the inputs D0 to D3 of the data selector $4e_1$. Any one of signals Q1 to Q4 is outputted from the output Q of data selector 4e, in response to a signal from the microcomputer 18. The time chart of FIG. 10 shows that the data selector $4e_1$ outputs a signal Q1 to a terminal D0.

Therefore, the output pulse signals Q1' and Q3' are delayed by a preset value of the second frequency divider 2A with respect to the signals Q1 and Q3. The preset value of the second frequency divider 2A, that is, the delay time can not be preset longer than one cycle of the clock pulse CLK1. Accordingly the maximum limit of delay of the signal Q1 with respect to Q1' is ¼ of one cycle. However, when selection of the data selector $4e_1$ is changed through Q1, Q2, Q3 to Q4, the delay time of Q1' and Q3' with respect to Q1 and Q3 assumes a delay time+(¼) cycle, a delay time+(2/4) cycle, and a delay time +(¾) cycle.

The signals Q1' and Q3' are then fed to the second power amplifier 22 so that an output voltage QB will be generated. Accordingly, delay in phase of the output voltage QB with respect to the output voltage QA may be preset to a value within a range 0° to 90° by presetting a preset value of the second frequency divider 2A. Furthermore, delay in phase of 0°, 90°, 180° and 270° in addition to the above-mentioned delay in phase may be preset by the operation of a control terminal of the data selector $4e_1$. Therefore, delay in phase substantially ranging from 0° to 36° may be preset. The microcomputer 18 is adapted to control the preset value of the second frequency divider 2A and the control terminal of the data selector $4e_1$.

Presetting of the preset value and the data selector $4e_1$ will be explained by way of example when the phase difference is preset to $\theta$. Now presetting of the data selector $4e_1$ is as follows:

When $0 < \theta < 90°$, Q1 may be selected (at this time, $\theta' = \theta$).

When $90° < \theta < 180°$, Q2 may be selected (at this time, $\theta' = \theta - 90°$).

When $180° < \theta < 270°$, Q3 may be selected (at this time, $\theta' = \theta - 180°$).

When $170° < \theta < 360°$, Q4 may be selected (at this time, $\theta' = \theta - 270°$).

The preset value may be determined as follows:

$$(24000 \div 4f) \times (\theta' \div 90)$$

For example, when f=40 kHz, $\theta = 120°$, the data selector $4e_1$ may be present to Q2 and the preset value of the second frequency divider 2A may be as follows:

$24000 \div (4 \times 40) \times 30 \div 90 = 50$. It will suffice to convert the value into 8 bit signal represented as "00110010".

Figure 11:
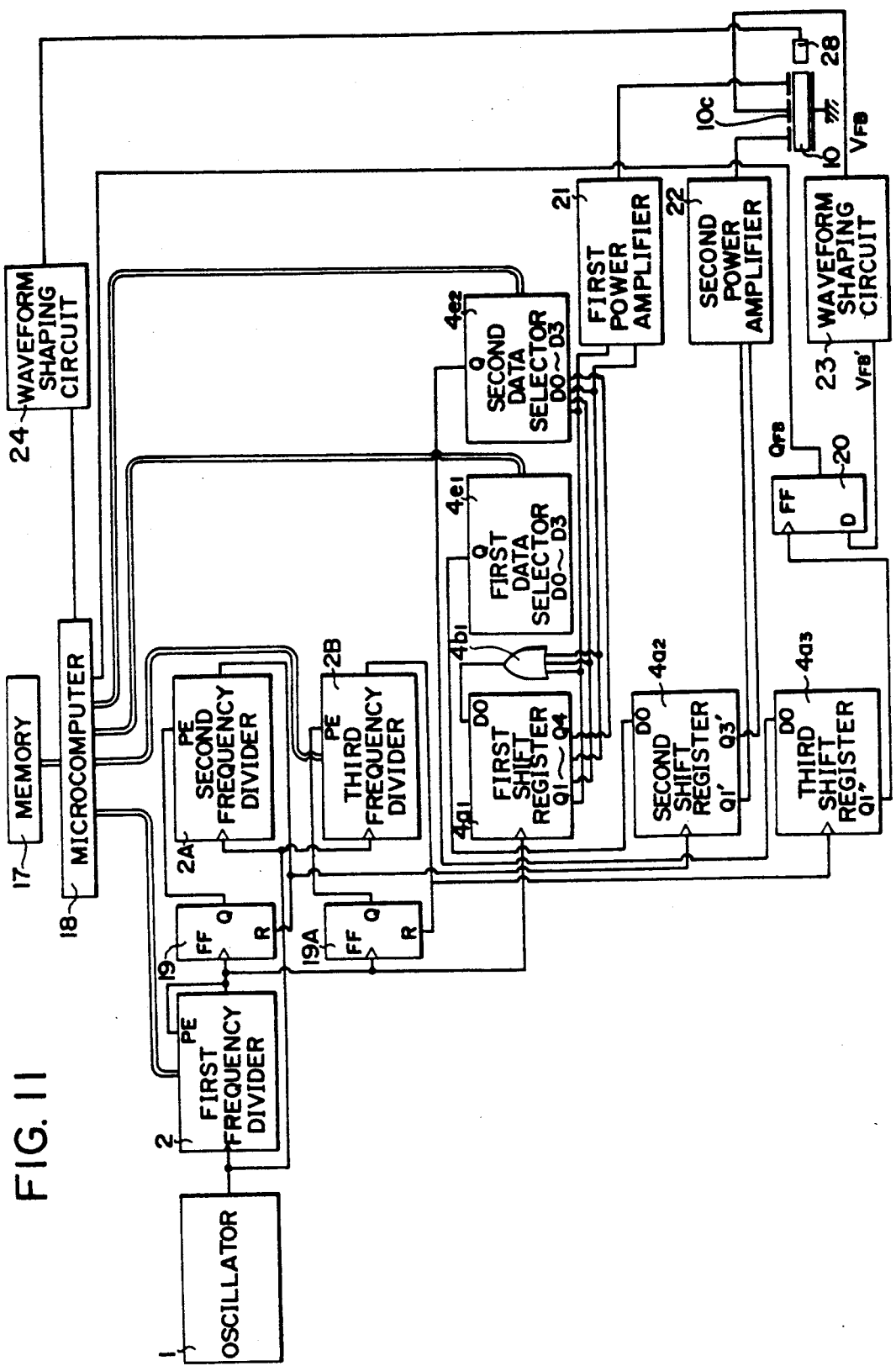
FIG. 11 is a block diagram showing a fourth embodiment of a circuit for driving an ultrasonic motor of the present invention.

Referring now to FIG. 11, there is shown a fourth embodiment of a circuit for driving an ultrasonic motor of the present invention. In the driving circuit of the fourth embodiment, motor speed can be controlled by changing the dividing ratio of a frequency divider or driving voltage phase by means of a microcomputer. In addition to this, advance and delay in phase is determined by comparing a reference phase signal with monitor signal by means of a phase comparator so that the microcomputer will change the frequency of driving voltages based on the result of the comparison.

The structure of the driving circuit of the fourth embodiment is identical with that of the third embodiment in oscillator 1, first and second frequency divider 2, 2A, FF19, first and second shift register $41_a$, $4a_2$, NOR gate $4b_1$, data selector $4e_1$, first and second power amplifiers 21, 22 except that a third frequency divider 2B which functions as a reference phase signal generator, third shift register $4a_3$, second data selector $4e_2$, flip flop circuit 20 which functions as a phase comparator and monitor signal shaping circuit 23 are additionally provided. The third frequency dividing circuit may be formed similarly to the first and second frequency dividing circuits. The third shift register $4a_3$ and the second data selector $4e_2$ may be formed similar to the first and second shift registers $4a_1$ and $4a_2$ and the first data selector $4e_1$, respectively. Accordingly, a detailed description of these circuits will be omitted.

In the thus formed driving circuit, an output Q1" of the third shift register $4a_3$ can output a signal which is delayed in phase by 0° to 360° with respect to the output Q1 from the first shift register $4a_1$ in response to a preset value fed from the microcomputer 18 to the third frequency divider 2B and a control signal from microcomputer 18 to the second data selector $4e_2$. In such a manner, a reference phase signal is generated. The reference phase signal is described in Japanese Unexamined Patent Publication No. Hei/1-209964, Japanese Patent Application No. 63-119987 and is well known.

The ultrasonic motor 10 is provided with a detector 10c including a sensor element for monitoring the vibration state. When the ultrasonic motor 10 is rotated, the detector 10c generates an alternating voltage having a frequency and a phase depending upon the state of vibration occurring in the motor having a frequency which is the same as the driving frequency. Accordingly, the alternating voltage is shaped by means of waveform shaping circuit 23 into a form which may be digitally processed. The rise-up of the waveform is compared with that of the reference phase signal. FF20 is used as a phase comparator. When the signal generated by the detector 10c of the ultrasonic motor 10 is delayed or advanced with respect to reference, the FF20 generates a signal "0" or "1", respectively.

Operation of the frequency tracking using a signal from FF20 by means of a microcomputer 18 will be described. The data of the reference phase signal are in advance stored in a memory 17. That is, data on phase of the output which is generated from the encoder 28 and waveform shaping circuit 24 (similar to circuit 23) when an optimum driving condition is attained are preliminarily stored. A preset value which is determined based upon the data which was processed or unprocessed is fed to the second and third frequency dividers 2A and 2B on driving of the ultrasonic motor 10. The data on the driving frequency and phase are stored in the memory 17. Based on the stored data, the microcomputer 18 transmits preset values to the first and second frequency divider 2A and the first data selector $4e_1$. When the motor 10 is started, the FF20 generates a signal "0" or "1". If the signal is "0", the microcomputer 18 transmits such a preset value to the first frequency divider 2 that the frequency becomes higher. If the signal is "1", the microcomputer 18 transmits such a preset value to the first frequency divider 2 that the frequency becomes lower. Repeating this operation causes the driving frequency to converge to such a value that the rise-up point of the output Q1" of the third shift register $4a_3$ is the same as that of the waveform shaping circuit 19. Therefore, an optimum driving frequency can be tracked.

The microcomputer 18 presets both the frequency driving ratio of the first frequency divider 2 and the delay time of the second frequency divider 2A in the aforementioned embodiments. Alternatively, the microcomputer 18 may preset any of the frequency driving ratio and the delay time.

What is claimed is:

1. A circuit for driving an ultrasonic motor by applying two phase alternating voltages to said motor, comprising:
   a digital oscillator for providing an output signal having an oscillation frequency higher than that of said alternating voltages;
   first means for presetting a frequency dividing ratio;
   means for dividing the oscillation frequency of the digital oscillator in accordance with the frequency dividing ratio preset by the first means to provide a first clock signal;
   second means for presetting a delay time which is an integer multiple of the period of the oscillation frequency of the digital oscillator;
   means for delaying the first clock signal in accordance with the delay time preset by said second means to provide a second clock signal;
   means for converting the first and second clock signals into first and second alternating voltages, respectively; and
   means for applying the first and second alternating voltages to said ultrasonic motor, wherein said second alternating voltage is delayed with respect to the first alternating voltage by said delay time.

2. A circuit for driving an ultrasonic motor as defined in claim 1 in which said frequency dividing means includes a downcounter preset to a value representing the frequency dividing ratio determined by said first means and which starts downcounting of the oscillation output signal of the digital oscillator from the present value and generates on shot pulse on completion of counting.

3. A circuit for driving an ultrasonic motor as defined in claim 1 in which said delay means includes a downcounter which receives said first clock signal as a preset enabling signal and starts downcounting responsive to the oscillation output signal of the digital oscillator from a preset value of the delay time preset by said second means and provides one shot pulse on completion of counting.

4. A circuit for driving an ultrasonic motor as defined in claim 1 in which said digital oscillator includes a quartz crystal oscillator.

5. A circuit for driving an ultrasonic motor as defined in claim 1 and further including means for monitoring the operating state of the ultrasonic motor to provide a monitor signal;

comparing means for providing a reference signal representative of an optimum driving state of the ultrasonic motor;

means for comparing the monitor signal with the reference signal; and means responsive to the result of the comparison of the comparing means for correcting the frequency dividing ratio which is supplied from the first means to said frequency dividing means.

6. A circuit for driving an ultrasonic motor as defined in claim 1 further including a switching means for providing an output from the frequency dividing means as the second clock signal when the value of the preset delay time of the second means is such that the phase difference between the first and second clock signals is zero.

7. A circuit for driving an ultrasonic motor which is driven by two phase alternating voltages, comprising:

a digital oscillator for providing an output signal having a frequency higher than that of said alternating voltages;

means for dividing the frequency of the output signal of the digital oscillator into a desired frequency to provide a first clock signal;

means for presetting a delay time by which said first clock signal is delayed;

means responsive to said means for presetting a delay time for delaying the first clock signal by an integer multiple of the period of the digital oscillator output signal in accordance with a preset value of the delay time of the presetting means to provide a second clock signal;

means for generating a first alternating voltage by dividing the frequency of the first clock signal by four; and means for generating a second alternating voltage by dividing the frequency of the second clock signal by four and by delaying the phase of the divided second clock signal by an integer multiple of 90°.

8. A circuit for driving an ultrasonic motor as defined in claim 7 in which the delay time preset by the means for presetting a delay time is a combination of a coarse delay value in which the phase of the second alternating voltage is delayed with respect to the first alternating voltage by an integer multiple of 90° and a fine delay value in which the coarse delay value is delayed with respect to the fine delay value by a period ranging 0°-90°, said coarse delay value being supplied to said second alternating voltage generating means and said fine delay value being supplied to said delay means.

9. A circuit for driving an ultrasonic motor with multi-phase alternating voltages, comprising:

a digital oscillator for providing an output signal having a frequency higher than that of said alternating voltages;

means for dividing the frequency of the output signal of the digital oscillator into a desired frequency to provide a basic clock signal;

a plurality of means, each for independently presetting a delay time for generating a plurality of delay clocks which are delayed with respect to the basic clock signal by different periods of delay time;

a plurality of delay means, each connected with respective delay time presetting means for generating a plurality of different delayed clock signals which are delayed with respect to said basic clock signal by different periods of delay time in accordance with the preset delay time; and voltage applying means which generates multi-phase alternating voltages from the basic clock signal and the plurality of delayed clock signals for applying the multi-phase alternating voltages to the ultrasonic motor.

10. A circuit for driving an ultrasonic motor with multi-phase alternating voltages, comprising:

a digital oscillator for providing an output signal having a frequency higher than that of said alternating voltages;

means for dividing the frequency of the output signal of the digital oscillator into a desired frequency;

delay means including a presettable digital counter for delaying the desired frequency from the frequency dividing means by an integer multiple of the period of the oscillation frequency of the digital oscillator;

means for applying the desired frequencies from the frequency dividing means and the delay means to the ultrasonic motor as multi-phase alternating voltages, respectively; and control means for adjusting said delay means by adjusting the presetting of said presettable digital counter to change the relative phase among the multi-phase alternating voltages.

11. A circuit for driving an ultrasonic motor as defined in claim 10 in which said applying means includes:

means for generating an alternating voltage having a frequency which is a quarter (¼) of that of the desired frequency of the frequency dividing means;

means for generating an alternating voltage having a frequency which is a quarter (¼) of that of the desired frequency of the delay means; and means for applying both of said generated alternating voltages to the ultrasonic motor.

12. A circuit for driving an ultrasonic motor with two phase alternating voltages, comprising:

a digital oscillator for providing an output signal having a frequency higher than that of said alternating voltages;

means for dividing the frequency of the output signal of the digital oscillator into a first clock of a desired frequency;

means for delaying the first clock by an integer multiple of the period of the digital oscillator output signal to generate a second clock;

instruction means connected with the frequency dividing means and the delay means for instructing a frequency dividing ratio and a delay time to the frequency dividing means and the delay means, respectively; and voltage applying means for generating first and second alternating voltages from the first and second clocks, respectively, said second alternating voltage being delayed by said delay time with respect to said first alternating voltage, to apply the two phase alternating voltages to the ultrasonic motor.

13. A circuit for driving an ultrasonic motor as defined in claim 12 and further including means for storing data representative of the frequency dividing ratio and the delay time.

14. A circuit for driving an ultrasonic motor as defined in claim 13 in which the data stored in said storing means are adjusting data specific to the ultrasonic motor for driving the ultrasonic motor at an optimum condition.

15. A circuit for driving an ultrasonic motor as defined in claim 12 in which said instruction means includes correction means which corrects and outputs data corresponding to the dividing ratio and the delay time for controlling the frequency driving speed of the ultrasonic motor.

16. A circuit for driving an ultrasonic motor with multi-phase alternating voltages, comprising:
   a digital oscillator for providing an output signal having a frequency higher than that of said alternating voltages;
   means for dividing the frequency of the output signal of the digital oscillator into a desired frequency;
   delay means for delaying the desired frequency from the frequency dividing means by an integer multiple of the period of the oscillation frequency of the digital oscillator to provide phase difference;
   means for applying the desired frequencies from the frequency dividing means and the delay means to the ultrasonic motor as multi-phase alternating voltages, respectively;
   means for electrically in advance storing at least one of frequency data and relative phase difference data of the alternating voltages to be applied to the ultrasonic motor; and
   control means including a microcomputer for changing at least one of frequency data and relative phase difference data of the multi-phase alternating voltages by adjusting at least one of the frequency dividing means and the delay means based upon the stored data of the storing means.

17. A circuit for driving an ultrasonic motor as defined in claim 16 in which said storing means stores at least one of the frequency data and the relative phase difference data of the driving alternating voltages for a plurality of kinds of ultrasonic motors.

18. An ultrasonic motor in which multi-phase alternating voltages are applied to electro-mechanical energy conversion elements to form a travelling vibration wave, comprising:
   a digital oscillator for providing an output signal having a frequency higher than that of said alternating voltages;
   means for dividing the frequency of the output signal of the digital oscillator into a desired frequency;
   delay means for delaying the desired frequency from the frequency dividing means by an integer multiple of the period of the oscillation frequency of the digital oscillator to provide phase difference;
   means for applying the desired frequencies from the frequency dividing means and the delay means to the ultrasonic motor as multi-phase alternating voltages, respectively;
   storing means for electrically in advance storing at least one of frequency data and relative phase difference data of the alternating voltages to be applied to the ultrasonic motor; and
   control means including a microcomputer for changing at least one of frequency data and relative phase difference data of the multi-phase alternating voltages by adjusting at least one of the frequency dividing means and the delay means based upon the stored data of the storing means.

19. A circuit for driving an ultrasonic motor which is driven by first and second alternating voltages having a predetermined phase relationship, comprising:
   first means for generating a signal having a fixed frequency output;
   second means for dividing the frequency output of said first means according to a division value;
   third means for adjusting the division value of said second means;
   fourth means for determining a time value and for delaying the output of said second means according to said time value;
   fifth means for adjusting the time value of said fourth means; and
   means responsive to said second means and said fourth means for generating first and second alternating voltages which are delayed respective to one another by the time value determined by said fourth means, said alternating voltages being applied to said ultrasonic motor.

20. A method for driving an ultrasonic motor which is driven by first and second alternating voltages having a predetermined phase relationship therebetween, said method comprising the steps of:
   generating a first pulse train of pulses having a fixed frequency rate;
   dividing said first pulse train according to a preset frequency dividing ratio for developing a second pulse train of pulses of desired frequency which is less than the frequency of said first pulse train;
   delaying said second pulse train according to a preset delay time to generate a third pulse train having the same frequency as said second pulse train and whose pulses are delayed from the pulses of the second pulse train according to said preset dealy time;
   converting the second and third pulse trains into first and second alternating voltages having a predetermined phase relationship determined by said preset delay time; and
   applying said first and second alternating voltages to the ultrasonic motor.

21. The method of claim 20 wherein the step of delaying the second pulse train is further comprised of the step of dividing the first pulse train by a pulse ratio determined by said preset delay time.

22. The method of claim 21 wherein said step of delaying said second pulse train further comprises the steps of initiating a count upon the occurrence of each pulse from said second pulse train; and
   counting a predetermined number of pulses from said first pulse train according to the preset delay time and generating an output pulse when said count is reached.

23. The method of claim 20 wherein said dividing step further comprises the steps of counting a predetermined number of pulses from said first pulse train responsive to a pulse of said second pulse train; and
   generating an output pulse when said predetermined number of pulses is reached and starting a new count of said predetermined number of pulses in said first pulse train responsive to each successive pulse of the second pulse train.

24. The method of claim 20 further comprising the steps of selecting predetermined ones of said pulses generated by one of said second and third pulse trains according to a preset value to further adjust the delay time between said first and second alternating voltage signals.

25. A method for controlling the operation of an ultrasonic motor which employs first and second alternating voltages having a predetermined phase relationship, comprising the steps of:

generating a first pulse train having a first predetermined frequency;

counting the pulses of the first pulse train;

generating a second pulse train in which the pulses thereof are produced each time a first preselected number of the pulses of said first pulse train is counted;

generating a third pulse train by counting pulses in said first pulse train each time a pulse in said second pulse train is generated;

said third pulse train having pulses which are delayed with respect to said second pulse train by a preselected delay time;

generating first and second alternating voltage signals from said second and third pulse trains; and applying the first and second alternating voltage signals to said ultrasonic motor.

26. The method of claim 25 further comprising the steps of:

generating a reference signal utilizing the first, second and third pulse trains to provide a phase relationship;

comparing the reference signal with a signal derived from the ultrasonic motor; and adjusting the first preselected number responsive to the phase relationship of the reference signal and the signal derived from the ultrasonic motor.

27. The method of claim 26 wherein the first preselected number is adjusted to reduce the frequency of the second pulse train when the signal derived from the ultrasonic motor leads the reference signal and is adjusted to increase the frequency of the second pulse train when the signal derived from the ultrasonic motor lags the reference signal.

28. The method of claim 26 further comprising the steps of:

determining the values of the first preselected number and the preselected delay time when the ultrasonic motor is operating at its optimum driving condition;

storing said values in a memory; and adjusting the stored values in a manner to reduce the phase difference between the compared signals to a null.

* * * * *

UNITED STATES PATENT AND TRADEMARK OFFICE
CERTIFICATE OF CORRECTION

| | | |
|---|---|---|
| PATENT NO. | : | 5,013,982 |
| DATED | : | May 7, 1991 |
| INVENTOR(S) | : | TOYOJI SASAKI |

It is certified that error appears in the above-identified patent and that said Letters Patent is hereby corrected as shown below:

```
In the Abstract:
Line 8, change "each of" to --each for--
Line 14, change "clock which are delay" to
     --clocks which are delayed--
Column 5, line 11, after "Fig. 10" insert --is--
Column 11, line 35, change "typed" to --type--
Column 12, line 2, change "CLK2" to --CLK0--
Column 12, line 3, change "CLK0" to --CLK2--
Column 12, line 19, change "4e," to --4e₁,--
Column 12, line 46, change "36°" to --360°--
Column 13, line 2, after "into" insert --an--
Column 14, line 55, change "on shot" to --one shot--
Column 15, line 3, delete "comparing"
Column 15, line 6, before "means" insert --comparing--
Column 16, line 31, change "(Y4)" to --¼--
Column 16, line 34, change "(Y4)" to --¼--
Column 17, line 4, before "dividing" insert --frequency--
Column 17, line 5, delete "frequency"
Column 18, line 30, change "dealy" to --delay--
```

Signed and Sealed this

Twenty-third Day of March, 1993

*Attest:*

STEPHEN G. KUNIN

*Attesting Officer*     Acting Commissioner of Patents and Trademarks